Dec. 14, 1948.   C. JOBST   2,456,423
INJECTION MOLDING MACHINE
Filed March 2, 1945
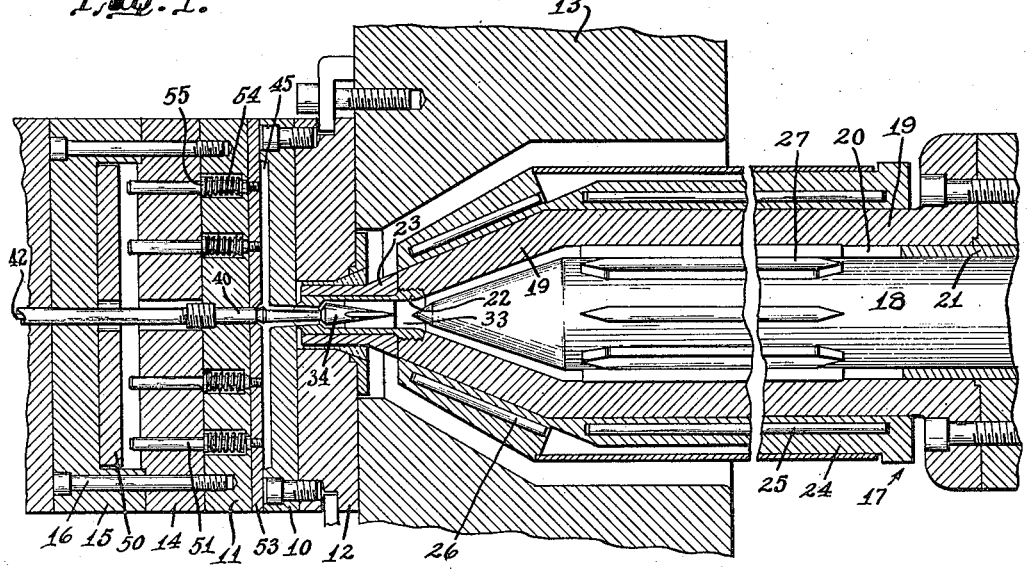
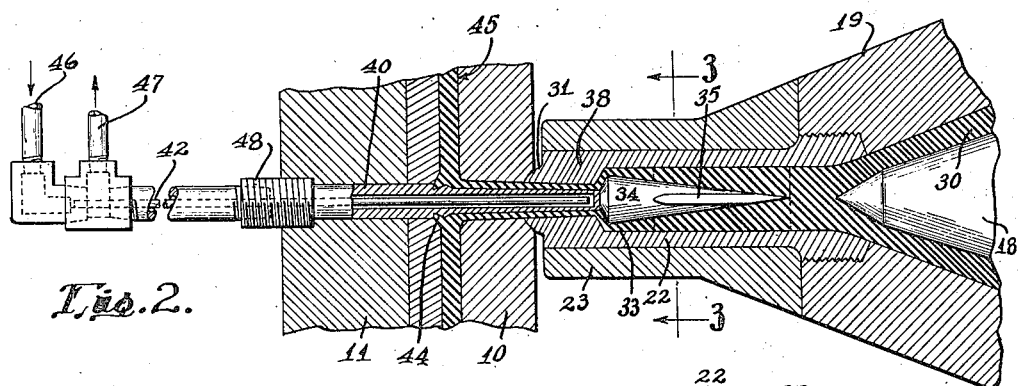
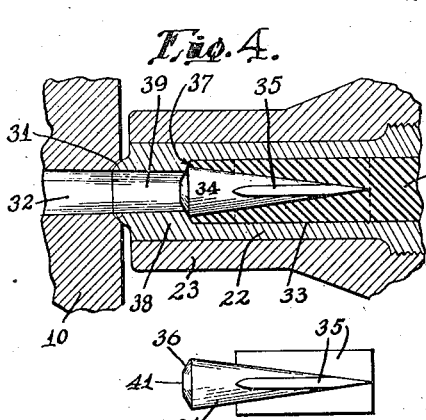
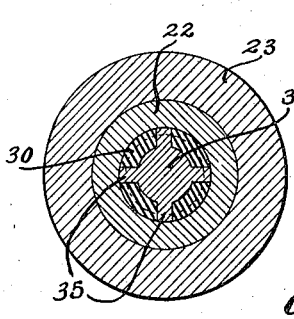
Inventor
CONRAD JOBST Patented Dec. 14, 1948

2,456,423

UNITED STATES PATENT OFFICE 2,456,423

INJECTION MOLDING MACHINE

Conrad Jobst, Toledo, Ohio, assignor, by mesne assignments, to Owens-Illinois Glass Company, Toledo, Ohio, a corporation of Ohio Application March 2, 1945, Serial No. 580,635

17 Claims. (Cl. 18—30)

My invention relates to injection molding machines for molding organic plastics and the like which are introduced into molds through an injection nozzle, the molded material being cooled and hardened while under pressure within the mold. The invention relates particularly to a novel form of injection nozzle and valve mechanism controlling the flow of molding material therethrough.

In standard injection molding machines at present in general use, the injection nozzle is provided with a small outlet opening through which material is forced into the mold, the opening being restricted so that the material will cool and harden or freeze at the outlet and thereby prevent discharge of the molten material while the mold is open. The use of such a restricted outlet opening involves serious objections. It necessitates the use of a very high pressure for forcing the plastic molding material through the outlet into the mold cavities, retards the rate at which the material can be forced into the mold cavities, and prevents the introduction of the material in a manner to provide the desired homogeneity and uniform high temperature of the material within the mold. Heretofore it has been proposed to provide a valve within the injection nozzle to permit the use of a larger outlet opening, the valve arranged to be closed automatically by the opening movement of the mold after the molding material in the mold and the sprue channel leading from the nozzle to the mold, has cooled and hardened. Such construction has been found impractical owing to the valve being clogged by the chilled material and sticking in a manner to prevent its proper functioning.

An object of the present invention is to overcome the above mentioned difficulties, by providing a valved nozzle combined with heating and cooling means so constructed and arranged that sticking of the valve is prevented.

A further object of the invention is to provide means by which the entire sprue can be withdrawn from the sprue channel which extends into the nozzle, leaving the valve free to move to closed position, thus overcoming a difficulty found in prior art devices, wherein portions of the molding materials are left within the channel to clog and interfere with perfect closing of the valve.

A further difficulty encountered in conventional machines is due to portions of the molding material being left in the sprue hole or tip of the nozzle when the mold is opened. These particles of chilled material which are cooled and hardened, are introduced into the mold cavity with the molten material in a succeeding mold charge. Very frequently some of these cold portions of the material entering the mold with the hot material are deposited against the walls of the mold cavity. As this chilled material does not have sufficient time to remelt and coalesce with the molten material, it results in forming blisters or imperfections in the surface of the molded article.

An object of the present invention is to overcome this difficulty by providing means by which the entire chilled portion or slug is withdrawn from the sprue channel, leaving no chilled material in the nozzle, thereby eliminating the possibility of blisters or blemishes such as above mentioned. The invention further provides a construction in which any particles of chilled material which may be left within the nozzle after the sprue has been withdrawn, are reheated and melted within the nozzle before being carried into the mold with a new charge of the molding material.

A further feature of the invention consists in providing an injection nozzle in which the cross sectional areas of the channel and its outlet are much greater than those of conventional nozzles in which the material must be frozen to seal the outlet and prevent bleeding or leakage while the mold is open. In accordance with my invention the molding material can be introduced rapidly into the mold at a comparatively low pressure. The mold cavity quickly fills with the molding compound at a uniform high temperature and in a homogeneous condition. Where conventional restricted nozzles are used, the molding material cannot be heated to a sufficiently high temperature and molten condition to give the best results. Such high temperature would necessitate the size of the outlet opening being reduced to such an extent that it would prevent efficient injection. The present invention is designed to overcome this difficulty as it provides a valved nozzle which permits the material to be heated to the high temperature required for best results, the valve serving to completely stop the flow and prevent leakage during the interval between mold charging operations.

A further object of the invention is to provide positive and reliable means by which the chilled material is completely separated from the hotter and more fluid material in the nozzle, thereby eliminating impurities or lack of homogenity caused by the mixing of comparatively cold molecules with those of the molten injected material.

Other objects of the invention will appear hereinafter.

Referring to the accompanying drawings:

Fig. 1 is a fragmentary sectional view of a valved injection nozzle, dies and associated parts of an injection molding machine embodying the present invention.

Fig. 2 is a similar view on a larger scale with certain parts omitted.

Fig. 3 is a section at the line 3—3 on Fig. 2.

Fig. 4 is a fragmentary sectional view showing the closed valve and nozzle tip.

Fig. 5 is a side view of the valve.

The machine comprises a mold including separable sections or die plates 10 and 11. The die plate 10 is bolted to a platen 12 mounted on an abutment 13 forming part of the machine frame. The die member 11 is bolted to backing plates 14 and 15 by screw bolts 16. The plates 11, 14 and 15 form a part of the mold carriage which is reciprocated horizontally toward and from the die plate 10 for opening and closing the mold.

The molding material is introduced into the mold through an injection nozzle 17 which includes a core 18 and a tubular member 19 surrounding the core and spaced therefrom to provide an annular chamber 20 or passageway through which the molding material is forced by a tubular injection plunger 21, into the mold. The forward portions of the nozzle and surrounding channel are tapered and merged into a nozzle tip which includes an inner tubular member 22 (Fig. 2) screw-threaded into the member 19, and an outer shell 23 of copper or other suitable material serving as a heater or heat-transmitting element. Surrounding the nozzle member 19 is a tubular heater 24 in which are embedded heating elements 25 and 26.

Spacing ribs 27 integral with the core 18, hold the core centered within the member 19. Molding material 30 which may be fed to the machine in granular or powdered form, is heated by the heater 24 while within the passageway 20 which serves as a heating chamber and thereby is reduced to a plastic or molten condition by the time it reaches the nozzle tip. The nozzle tip is formed at its outer end with a convex surface 31 which seats on a correspondingly-shaped annular bearing surface on the die plate 10 surrounding a sprue opening 32 extending through the die plate.

The tubular member 22 provides a valve chamber 33 within which is slidably mounted a cone-shaped valve 34. The valve is formed with wings 35 by which the valve is centered and guided in sliding contact with the inner walls of the valve chamber. The forward end of the valve is formed with a tapered annular bearing surface 36 which seats on an inclined surface 37 or shoulder (Fig. 4) at the junction of the chamber 33 and the sprue opening or channel 39, the latter being of smaller diameter than the chamber 33 and extending through the forward end portion 38 of the member 22.

A tubular ram rod 40 or plunger mounted in alignment with the injection nozzle, extends through aligned openings in the die plates and protrudes into the nozzle tip when the die plates are together for closing the mold. The forward end of the hollow ram 40 is closed and forms an abutment surface in contact with a flat end surface 41 (Fig. 5) of the valve. The ram is cooled by water or other fluid circulated therethrough. The circulating system includes an inner tube 42 extending lengthwise within the ram. The cooling fluid enters through a pipe 46, flows through the tube 42 to the forward end of the ram and returns through the annular passageway surrounding the tube 42 to a discharge pipe 47. The cooling fluid is circulated continuously and serves to chill the molding material forming the sprue as more fully described hereinafter. The ram 40 is formed in its exterior surface with an annular recess 44 providing an anchor by which the sprue or slug formed in the sprue opening is anchored to the ram and withdrawn from the nozzle when the die plate 11 is withdrawn for opening the mold. The molding material is distributed to the mold cavities through channels 45 and lateral channels formed in the die plate.

The ram 40 is connected with the die plate 11 by means of a threaded coupling 48. Means for ejecting the molded article or articles from the die plate 11 when the latter is withdrawn, includes an ejector bar 50 within a recess in the plate 15. The bar 50 is positioned behind a row of rods 51 which extend through openings in the plate 14 and die plate 11 and at their forward ends are threaded into a stripper bar 53. Coil springs 54, surrounding the pins 51 and housed within the die plate 11, are held under compression between bearing surfaces in the die plate and collars 55 on said pins, thereby holding the stripper bar 53 against the die plate 11. When the mold carriage is withdrawn, for opening the molds, the ejector bar 50 is arrested at a predetermined point so that continued movement of the die plate 11 causes the pins 51 to engage the ejector bar 50. This stops the stripper bar 53 while the die plate 11 continues its movement, thereby causing the stripper bar to eject the molded articles from the mold, release the sprue from its anchor 44 and strip it from the rod 40.

The operation may be summarized as follows:

While the die plates are together as shown in Fig. 1, a charge of molding material is forced into the molds by the forward movement of the annular plunger 21. The material is heated and reduced to a plastic or fluid condition while within and passing through the heating zone determined by the heater 24. The material as it is ejected from the nozzle, fills the sprue channels and mold cavities and quickly sets and hardens within the mold and also within the sprue opening. The mold carriage is then withdrawn to separate the die plates, the molded articles being carried with the movable die plate 11 which at the same time withdraws the ram 40 from the sprue opening in the nozzle tip. The water circulating within the ram has, but the time the mold commences to open, chilled the surrounding material and hardened it sufficiently to cause the entire slug or sprue to be withdrawn. The molding material surrounding the valve is at a substantially higher temperature than that which forms the sprue, being more remote from and out of direct contact with the cold ram and also more fully within the influence of the heater, so that the molding material which surrounds the forward end of the valve remains in a fluid or plastic condition. The valve is thus free to move forward to its seat and close the nozzle tip as the sprue is withdrawn. A clean separation of the material takes place at the valve seat where the chilled slug is pulled off from the fluid material surrounding the valve. As the carriage with the die plate 11 continues its withdrawing movement, the ejector bar 50 operates to eject the molded article or group of articles, the stripper bar 53 at the same time forcing the sprue from its anchor 44 and stripping the sprue from the ram 40. The carriage is then moved forward and closes the mold while the ram 40 contacts the valve and forces it to open position, leaving the parts ready for the next charge.

Modifications may be resorted to within the spirit and scope of my invention.

I claim:

1. An injection molding machine comprising a nozzle having a passageway therethrough for the passage of molten molding material, said passageway including a valve chamber, a valve located entirely within said chamber and movable to closed position by the pressure of the molding material within said chamber, thereby preventing bleeding of the molten material, and means separate from the valve and mounted for movement relative thereto into and out of the path of movement of the valve and operable independently of the molding material to move the valve to open position.

2. An injection molding machine comprising a nozzle having a passageway therethrough for the passage of molten molding material, said passageway including a valve chamber, a valve located entirely within said chamber and movable to closed position by the pressure of the molding material within said chamber, thereby preventing bleeding of the molten material, and means separate from the valve and mounted for movement relative thereto into and out of the path of movement of the valve and operable independently of the molding material to move the valve to open position, said passageway being of large cross-sectional area to permit the free flow of the material through the nozzle.

3. An injection nozzle having a central passageway for the passage of molten molding material, said passageway including a valve chamber and a sprue opening extending from the nozzle outlet orifice inwardly to said chamber, a valve within said chamber, means within and extending along said sprue opening between the valve chamber and said orifice and separate from the walls of said opening for chilling and hardening a sprue of molding material in said sprue opening, and means for maintaining the material in the valve chamber at a comparatively high temperature and thereby preventing hardening thereof during said hardening of the sprue, thereby permitting the sprue to be withdrawn from the nozzle and the valve to close and prevent leakage of the hot material.

4. An injection molding machine comprising a die plate having a sprue opening extending therethrough, an injection nozzle abutting the die plate and having a passageway therethrough in register with said sprue opening and comprising a valve chamber, a valve in said chamber free for movement by pressure of molding material in said passageway into position to close the passageway, said passageway including a section of reduced diameter extending from said valve chamber forwardly to the mouth of a nozzle and forming a continuation of the said sprue opening through the die plate, a valve holding device mounted for movement through said reduced section of the passageway into position to contact the valve and hold it in open position to permit the flow of molten molding material through the sprue opening to the mold cavity, and means for withdrawing said valve holding device and the sprue out of said passageway and out of contact with the valve and thereby permitting the valve to be closed by the pressure of the molten material in said passageway.

5. An injection molding machine comprising a die plate having a sprue opening extending therethrough, an injection nozzle abutting the die plate and having a passageway therethrough in register with said sprue opening, said passageway comprising a valve chamber and a section of reduced diameter extending from said valve chamber forwardly to the mouth of a nozzle and forming a continuation of the said sprue opening through the die plate, a valve mounted in said chamber free for forward movement when pressure is applied thereon by the molding material flowing in said passageway, from an open position to a position to close said passageway, a valve holding device mounted for movement through said reduced section into the path of the valve and providing a means for holding the valve in open position to permit the flow of molten molding material through the sprue opening to the mold cavity, means for extracting heat from said valve holding device and thereby chilling and hardening the sprue formed in the sprue opening, means for maintaining the material in the valve chamber at a comparatively high temperature during said chilling and hardening of the sprue, and means for withdrawing the hardened sprue and said valve holding means out of said passageway and thereby permitting the valve to be closed by the pressure of the molten material within the valve chamber.

6. An injection molding machine comprising a die plate having a sprue opening extending therethrough, an injection nozzle abutting the die plate and having a passageway therethrough in register with said sprue opening and comprising a valve chamber, a valve in said chamber, said passageway including a section of reduced diameter extending from said valve chamber forwardly to the mouth of a nozzle and forming a continuation of the said sprue opening through the die plate, a cooling device extending lengthwise through the sprue opening in the die plate and said continuation thereof in the nozzle, means for circulating a cooling fluid through said chilling device and thereby chilling the sprue, means for anchoring the chilled sprue to said device, and means for withdrawing said device and thereby withdrawing the chilled sprue and permitting the valve to be closed by the pressure of the hot molding material therein.

7. An injection molding machine comprising a die plate, an injection nozzle having a channel therethrough for the passage of molten molding material, said channel including a valve chamber spaced inwardly from the outlet orifice of the nozzle, a valve within said chamber and movable therein to and from a position to close said channel, said die plate having a sprue opening extending therethrough in register with the nozzle orifice, the portion of said channel between the die plate and valve chamber forming an extension of the sprue opening, a rod extending lengthwise through the sprue opening into contact with the valve in position to hold the valve open, and means for withdrawing said rod away from the valve and out of the sprue opening together with the sprue formed in said sprue opening, thereby permitting the valve to be closed.

8. An injection molding machine comprising a die plate, an injection nozzle having a channel therethrough for the passage of molten molding material, said channel including a valve chamber spaced inwardly from the outlet orifice of the nozzle, a valve within said chamber and movable therein to and from a position to close said channel, said die plate having a sprue opening extending therethrough in register with the nozzle orifice, the portion of said channel between the die plate and valve chamber forming an extension of the sprue opening, a ram extending lengthwise through the sprue opening into position to contact with the valve and hold it open, said ram having a passageway therein for the circulation of a cooling fluid for chilling and hardening the sprue, means for maintaining the material in the valve chamber at a comparatively high temperature and in a molten condition during said chilling of the sprue, and means for withdrawing the ram and sprue and thereby releasing the valve and permitting it to be closed by the pressure of the molten material in the valve chamber.

9. An injection nozzle comprising a tubular element forming the tip of the nozzle and providing a passageway for the flow therethrough of molten or fluid molding material, said passageway including a valve chamber terminating at a point inwardly from the outlet orifice, a valve in said chamber, the portion of said passageway between said orifice and said chamber being of smaller diameter than the valve chamber and forming a sprue channel, the end wall of the valve chamber surrounding the sprue channel being formed to provide an annular valve seat for the valve, and a ram separate from the valve and extending through said channel and mounted for movement lengthwise of the channel from a position in which it is out of contact with the valve and withdrawn from the channel, to a position to abut the valve and hold it open, and means for causing said movements of the ram.

10. An injection nozzle comprising a tubular element forming the tip of the nozzle and providing a passageway for molten or fluid molding material to flow, said passageway including a valve chamber terminating at a point inwardly from the outlet orifice, a valve in said chamber, the portion of said passageway between said orifice and said chamber being of smaller diameter than the valve chamber and forming a sprue opening, the end wall of the valve chamber surrounding the sprue opening being formed to provide an annular valve seat for the valve, a ram extending through said orifice into position to abut the valve and hold the valve open, means cooperating with the ram for cooling the latter and thereby chilling the sprue in said sprue opening, means for maintaining the material in the valve chamber at a high temperature and fluid during said chilling of the sprue, and means for withdrawing the ram and separating the sprue from the fluid material at the region of said valve seat, thereby permitting the valve to be closed by pressure of the material within the valve chamber.

11. An injection molding machine comprising a pair of die plates relatively movable toward and from each other, an injection nozzle having a valve chamber therein and a sprue channel extending from the valve chamber to an outlet orifice in the nozzle, a valve in said chamber, a rod connected to one said die plate and extending through the sprue channel and into position to engage the valve and hold it open while the die plates are together, and to be withdrawn from the valve and sprue channel when the die plates are separated and permit the valve to close.

12. An injection molding machine comprising a stationary die member, a die member movable toward and from said stationary die member, an injection nozzle, a valve therein, and a valve-operating rod separate from the valve and connected to move with the movable die member into a valve opening position in which it projects into the nozzle, into contact with the valve, and movable with the die member to a retracted position out of contact with the valve and outside of the nozzle.

13. An injection molding machine comprising a die plate having a stationary mounting and formed with a sprue opening therethrough, an injection nozzle in register with said opening, a valve within said nozzle and movable toward and from the die plate to closed and opened positions, a second die plate movable toward and from the stationary die plate, a rod connected to move with said movable die plate and projecting through said opening and into the nozzle in position to contact the valve and hold it open when the die plates are together, and movable with the movable die plate to a position in which it is out of contact with the valve and withdrawn from said opening when the die plates are separated.

14. An injection molding machine comprising a die plate having a stationary mounting and formed with a sprue opening therethrough, an injection nozzle in register with said opening, a valve within said nozzle and movable toward and from the die plate to closed and opened positions, a second die plate movable toward and from the stationary die plate, a rod connected to move with said movable die plate and projecting through said opening and into the nozzle in position to contact the valve and hold it open when the die plates are together, and movable with the movable die plate to a position in which it is withdrawn from said opening when the die plates are separated, said rod being provided with a passageway therethrough for the circulation of a cooling liquid for freezing the sprue in said opening.

15. An injection molding machine comprising a die plate having a stationary mounting and formed with a sprue opening therethrough, an injection nozzle in register with said opening, a valve within said nozzle and movable toward and from the die plate to closed and opened positions, a second die plate movable toward and from the stationary die plate, a rod connected to move with said movable die plate and projecting through said opening and into the nozzle in position to contact the valve and hold it open when the die plates are together, movable with the movable plate to a position in which it is withdrawn from said opening when the die plates are separated, said rod being formed to provide an anchor for holding the sprue thereon, a stripper bar mounted on said movable die plate and movable relative to the latter toward and from the stationary die plate, and means for causing said relative movement of the stripper bar when the die plates are separated and thereby disengaging the sprue from said anchor.

16. An injection molding machine comprising a die plate having a sprue opening extending therethrough, an injection nozzle abutting the die plate and having a passageway therethrough in register with said sprue opening and comprising a valve chamber, a valve in said chamber, said passageway including a section of reduced diameter extending from said valve chamber forwardly to the mouth of a nozzle and forming a continuation of the said sprue opening through the die plate, said nozzle being formed with a valve seat for the said valve at the junction of the valve chamber and said reduced section of the passageway, a cooling device extending lengthwise through the sprue opening into position to contact the valve and hold it off its seat, means for circulating a cooling fluid through said cooling device and thereby chilling the sprue, means for anchoring the chilled sprue to said device, and means for withdrawing said device and thereby withdrawing the chilled sprue and permitting the valve to be closed by the pressure of the hot molding material in the valve chamber.

17. An injection molding machine comprising die plates, a nozzle having a passageway therethrough for the passage of molten molding material, a valve within said passageway and movable therein to and from a closed position in which it closes said passageway, one of said die plates being movable relatively to the other to and from a closed position, a valve operating device operatively connected to said movable die plate and moved thereby into position to extend within said passageway into contact with the valve and open the valve when the die plate is moved to closed position, the valve operating device being withdrawn from the valve and said passageway when the die plate is moved to open position, permitting the valve to be closed.

CONRAD JOBST.

REFERENCES CITED

The following references are of record in the file of this patent:

UNITED STATES PATENTS

| Number | Name | Date |
|---|---|---|
| 1,599,624 | Stern | Sept. 14, 1926 |
| 2,111,857 | Jeffery | Mar. 22, 1938 |
| 2,318,031 | Tucker | May 4, 1943 |
| 2,345,917 | Coffman | Apr. 4, 1944 |
| 2,306,316 | Marsh | Dec. 22, 1942 |